United States Patent [19]

Pepper et al.

[11] Patent Number: 5,214,858
[45] Date of Patent: Jun. 1, 1993

[54] TEACH AND REPEAT PROBE FOR A ROBOT ARM

[76] Inventors: Stuart E. Pepper; Stephen T. Robinson, both of Samlesbury Aerodrome, Balderstone, Lancashire, United Kingdom, BB2 7LF

[21] Appl. No.: 655,067

[22] Filed: Feb. 14, 1991

[30] Foreign Application Priority Data

Jul. 12, 1990 [EP] European Pat. Off. ........ 90307655.2

[51] Int. Cl.⁵ .......................... G01B 7/00; G01B 7/31
[52] U.S. Cl. ........................................ 33/558; 33/561; 901/10
[58] Field of Search ............................ 73/866.5, 865.8; 33/558, 561, 533, 645; 901/3, 4, 5, 10, 46

[56] References Cited

U.S. PATENT DOCUMENTS

| | | | |
|---|---|---|---|
| 2,941,140 | 1/1960 | Rudolf, Jr. et al. | 323/51 |
| 3,821,855 | 7/1974 | Baker et al. | 33/542 |
| 3,840,994 | 10/1974 | Izumi et al. | 33/557 X |
| 4,043,046 | 8/1977 | Thomas | 33/558 X |
| 4,138,823 | 2/1979 | McMurtry | 33/561 |
| 4,477,976 | 10/1984 | Suzuki | 33/558 |
| 4,477,978 | 10/1984 | Azuma | 33/600 |
| 4,638,668 | 1/1987 | Leverberg et al. | 73/861.5 |
| 4,696,190 | 9/1987 | Bucher et al. | 73/865.8 |
| 4,865,008 | 1/1986 | Stölben | 33/561 |

FOREIGN PATENT DOCUMENTS

| | | |
|---|---|---|
| 0092021 | 10/1983 | European Pat. Off. . |
| 3711721C1 | 4/1987 | Fed. Rep. of Germany . |
| 3604526A1 | 8/1987 | Fed. Rep. of Germany . |
| 2532416 | 8/1982 | France . |
| 2215843A | 9/1989 | United Kingdom . |

Primary Examiner—Tom Noland
Attorney, Agent, or Firm—Nixon & Vanderhye

[57] ABSTRACT

A probe used for programming a robot arm in order to perform a cutting operation on a work-piece. During the programming operation, the probe is attached to the robot arm and moved around the profile of a test-piece. An electric lamp is provided for indicating contact between the probe and the test piece. Additional circuitry including an electric lamp is provided for indicating when the body of the probe and a pin (4) having an end tip (8) which actually forms the contracting portion of the probe are misaligned.

10 Claims, 2 Drawing Sheets

TEACH AND REPEAT PROBE FOR A ROBOT ARM

BACKGROUND OF THE INVENTION

1. Field of the Invention

This invention relates to components for robot arms and has particular application to robot arms used for cutting or drilling a work piece. Specifically, the invention provides an improvement to teach and repeat probes for robot arms.

2. Discussion of Prior Art

In order to program a robot arm to perform a specified cutting or drilling operation on a work-piece it is necessary to initially perform some type of teaching process. The "teach and repeat" method is one such process.

When teaching a robot arm how to perform a cutting process, for example, one known teach and repeat method involves replacing the cutting tool with a probe and moving the robot arm with the probe attached around the contours of a test-piece. The test-piece has the same shape as the finished component which is to be cut out of the work-piece. The robot arm is driven manually by an operator and is taught from one point to the next around the profile of the piece. Points chosen by the operator are programmed into the robot arm manually. Thus when the probe is replaced by the cutting tool, the robot arm automatically cuts the desired shape by moving between consecutive program points.

The probe and test-piece alignment must be done by visual inspection with the occasional assistance of a feeler gauge. This method has the disadvantage that viewing often has to be done at very awkward angles. When many points need to be programmed into the robot arm, this procedure is very laborious.

Known teach and repeat probes are of a solid, rigid design. They have a larger diameter than the cutting tool so that they are not prone to bending when in use. Any bending of the probe, would of course give rise to inaccuracies in the program points. Having an oversized probe is a disadvantage because in order to compensate for the larger diameter of the probe, the test-piece must be made correspondingly smaller than the desired finished article.

SUMMARY OF THE INVENTION

The present invention aims to overcome the above disadvantages and consists of a probe comprising an elongate, electrically conducting hollow body which houses an electrically conducting pin, the pin extending beyond one end of said body and being located within the hollow body and insulated therefrom by at least one resilient washer.

The presence of the washer enables a small degree of relative movement between the pin and hollow body without the pin being bent and therefore damaged. Preferably, the body and pin are of cylindrical form. Sufficient compression of the washer results in contact between the pin and hollow body.

Preferably electrical means are provided for indicating contact between the pin and a test-piece.

The electrical means may be an electrical circuit comprising the pin, test-piece, a power supply and a lamp; the lamp lighting when the circuit is made. Hence contact between the probe and test-piece can be monitored simply by observing the lamp without the need for visually inspecting the test-piece at awkward angles.

Optionally, additional electrical means are provided for indicating contact between the pin and the hollow body. Hence movement of the pin relative to the hollow body and robot arm to which, in use, it is secured, can be monitored. This option allows the pin to be made the same diameter as the cutting tool itself and hence a full-size test-piece can be used whilst still adhering to tolerances of the robot arm and finished component.

BRIEF DESCRIPTION OF THE DRAWINGS

An embodiment of the invention will now be described by way of example only with reference to the drawings of which.

DESCRIPTION OF THE PREFERRED EMBODIMENTS

Figure 1:
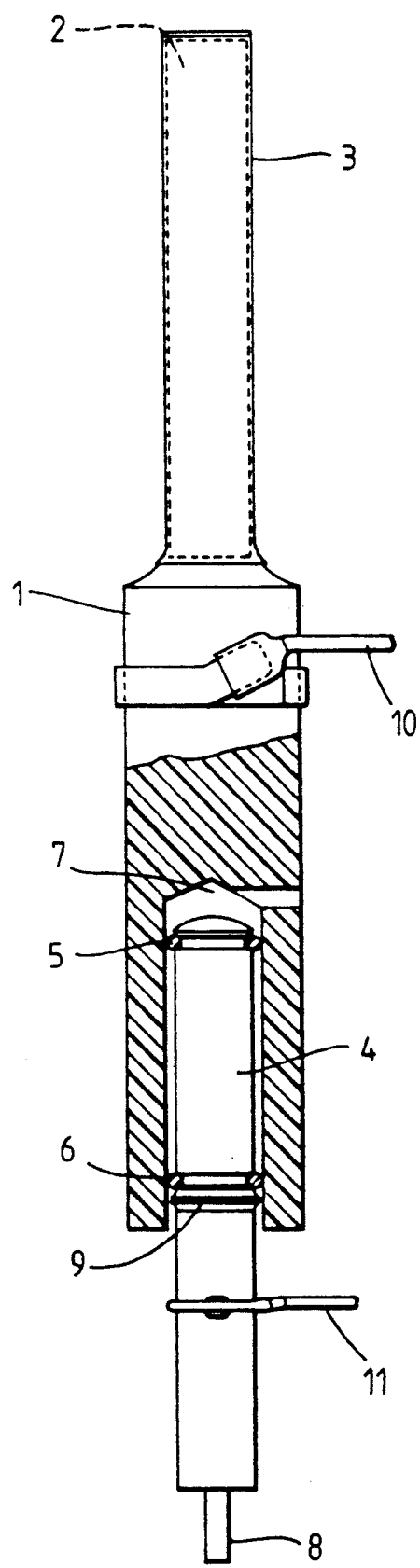
FIG. 1 is a part-sectioned side view of a probe in accordance with the invention.

FIG. 1 shows a hollow cylindrical body 1 made from metal and electroplated against corrosion. Extending from one end of the body 1 is a shank 2 covered by an insulating sleeve 3. An electroplated metal pin 4 is housed within the body 1 and extends beyond that end of the body opposite the shank 2.

The pin 4 is located within and insulated from the body 1 by two rubber 'O' rings 5, 6. A dome-shaped upper end of the pin 4 is insulated from the body 1 by a plastic seating 7. The lower end of the pin 4 which extends beyond the body 1 terminates in an end tip 8 of smaller diameter than the rest of the pin 4. The diameter of the end tip 8 is the same diameter as the cutting tool to be used. The pin 4 also incorporates an annular electrically conducting ring 9 at a position close to the point at which the pin 4 emerges from the body 1. A small degree of clearance exists between the ring 9 and internal wall of the body 1 so that the pin 4 and body 1 are not normally in contact with one another.

Electrical connections 10 and 11 are made to the body 1 and pin 4 so that they form parts of electrical circuits to be described with reference to FIG. 2. A lamp L1 is connected between the negative terminal of a power supply 12 and a test piece 13. A second lamp L2 is connected between the negative terminal of the power supply 12 and the hollow body 1. The positive terminal of the power supply 12 is connected to the pin 4.

In use, the shank 2 with its insulating sleeve 3 is inserted into the chuck of a "pacer unit". The pacer unit forms part of a robot arm such as a "Cincinatti 786V5" six-axis electromechanical robot. The robot is programmed into a "teach and repeat" mode of operation.

The robot can be used, for example, with an abrasive jet water cutting apparatus. In this case, the end tip 8 is made to have the same diameter as the cutting jet.

Abrasive water-jet cutting is the cutting of materials using a jet of water at extremely high or "intensified" pressure, into which an abrasive powder is fed by "venturi" action. The resultant jet is fed into a mixing tube or cutting nozzle, which is of accurate dimensions and is held in position in the pacer unit by a collet and nut.

The pacer unit is rigidly mounted to the "roll plate" of the Cincinatti 786V5 robot.

As the robot arm moves about its radius of operation, the cutting jet having cut the component where programmed, the force of the jet is absorbed by a large tank two thirds full of water. Inside the tank is a large tooling raft securely fixed and co-related for program purposes to the robot.

Small tool "towers" are jig-located to this raft by the datum pads attached. The actual work piece is located and bolted to the top of these towers.

Whilst the "teach and repeat" process is being carried out, the cutting nozzle is replaced by the probe of FIG. 1 and the work-piece is replaced by a test-piece. The test-piece has the same shape and dimensions a the required finished component.

The robot arm is driven by the operator using the "hand pendant" which is a remote control unit connected to the main robot control. The robot arm is taught from one programmed point to the next as the probe is moved around the profile of the test-piece until a complete program is achieved. The facilities on the "hand pendant" include small, slow movements of the robot and a "program" button.

During the programming operation, the end tip 8 always remains in contact with the test-piece 11. By virtue of the compressibility of the 'O' rings 5, 6, the pin 4 is free to move by a small amount with respect to the hollow body 1. The degree of movement is limited by the annular ring 9.

Whilst the end tip 8 is in contact with the test-piece 13, the circuit comprising the tip 8, the lamp L1 and the test-piece 13 will be made, thus the lamp L1 will light. Hence, an indication that the test-piece 13 and probe are in contact is provided.

If the end tip 8 is moved with respect to the body 1 such that the 'O' rings 5, 6, compress and the annular ring 9 makes contact with the body, then the lamp L2 will also light. This indicates that the point of contact between end tip 8 and test-piece 13 is not correctly aligned with the robot arm. When the robot arm is moved fractionally to extinguish the lamp L2 then the operator knows that the end tip 8 is aligned with the robot arm to within the tolerance set by the clearance between the annular ring 9 and internal wall of the hollow body 1. When this point is reached, the operator presses the "program" button and the location ie, the X-Y co-ordinates of the point is stored by the robot.

This procedure is repeated as the robot arm and probe are moved around the profile of the test-piece until a sufficient number of locations have been programmed into the robot.

Subsequently, the probe is replaced by the cutting nozzle and the test-piece replaced by an uncut work-piece. The robot can then be set to cut automatically by following the program stored.

In an alternative embodiment, the probe of FIG. 1 incorporates a modification which facilitates alignment of the probe with respect to the test-piece in the "Z" direction ie, a direction parallel to the longitudinal axis of the hollow body 1. This facility is useful when programming a robot to cut a work-piece having a non-uniform depth.

Figure 3:
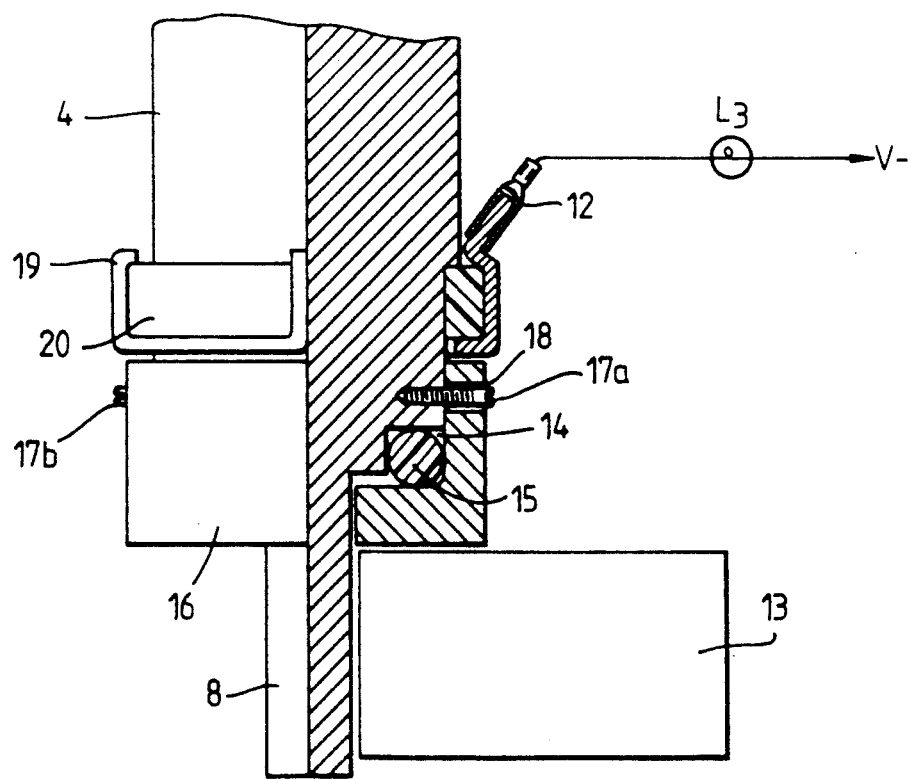

The modified probe of FIG. 3 has an annular groove 14 cut in the shoulder of the pin 4 adjacent to the end tip 8.

An 'O' ring 15 is held in the groove by a brass cap 16. The cap 16 is a sliding fit over the pin 4 and is held loosely thereon by two screws 17a, 17b. The screws 17a, 17b are fitted into the pin 4 through longitudinal slots 18 in the cap 16. Thus the brass cap 16 is permitted a small amount of movement, relative to the pin 4 in the 'Z' direction by virtue of the slots 17a, 17b and the compressibility of the 'O' ring 15.

As the cap 16 is moved along the pin 4 and the 'O' ring 15 compresses, the cap 16 makes contact with a copper collar 19 which is crimped onto an insulating plastics ring 20. The plastics ring 20 is an interference fit around the pin 4 and is adjacent to that end of the cap 16 remote from the end tip 8.

The brass cap 16 and copper collar 19 form part of an electrical circuit which also comprises a lamp L3, power supply 12 the pin 4 and the test-piece 13. The circuit is wired up so that when the cap is in contact with both the test-piece 13 and the copper collar 19, the lamp L3 is illuminated.

Figure 2:
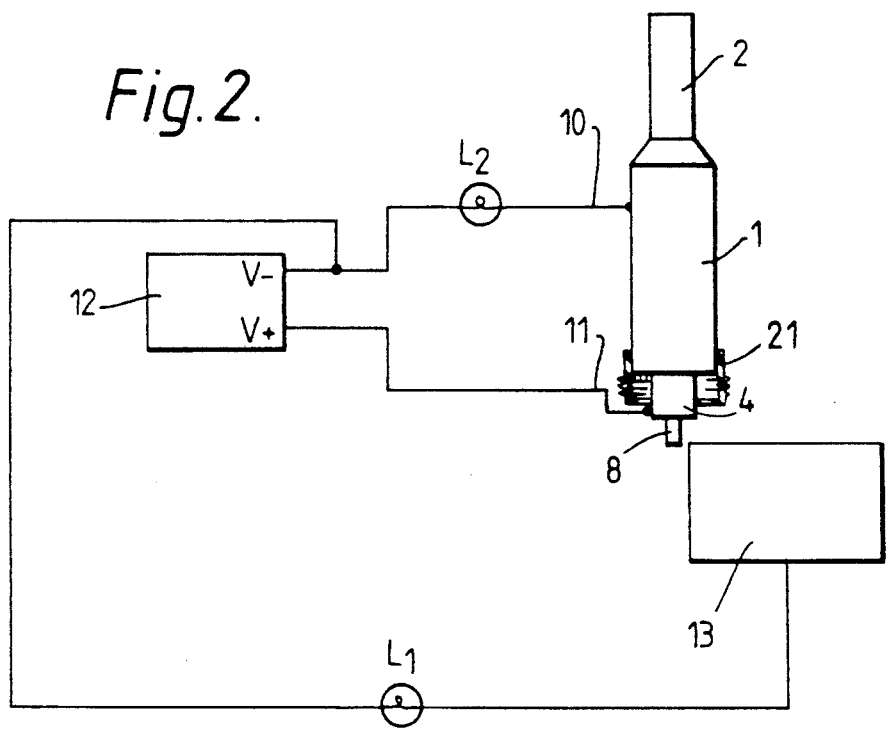
FIG. 2 shows, schematically, electrical connections between the probe of FIG. 1 and associated apparatus, and, FIG. 3 is a part-sectioned view of a modification of the probe of FIG. 1.

In operation, the probe is wired up as in FIG. 2 and the third lamp L3 is connected between the copper collar 19 and the negative terminal of the power supply 12. As the end tip 8 is brought into contact with the test-piece 13, the lamp L1 will light. Any misalignment of the pin 4 within the housing 7 will be indicated by illumination of the lamp L2. When the lamp L2 is extinguished (and lamp L1, remains lit) the operator knows that the robot arm and end tip 8 are correctly positioned in the X-Y plane. To align the robot arm and probe in the Z axis, the operator moves the probe downwards so that the brass cap 16 come into contact with the test-piece 13. As the arm is moved downwards further still, the brass cap will begin to slide up the pin 4 compressing the 'O' ring 15 as it does so and subsequently making contact with the copper collar 19. As contact is made, the lamp L3 will be illuminated. The operator then raises the robot arm slightly until the lamp L3 is extinguished. At this point, the operator knows that the robot arm is positioned correctly in the Z direction to the tolerance set by the clearance between the copper collar 19 and brass cap 16 when the cap 16 is exerting no pressure on the 'O' ring 15.

Whilst the use of the probe in accordance with the invention has been described with reference to a water-jet cutter, it will be understood that it has application in other robotic fields or any cutting or drilling process that uses a similar programming "teach and repeat" process.

By altering the clearance between the annular ring 9 and hollow body 1, and the distance between the annular ring 9 and end tip 8, any desired tolerance range can be accommodated.

Optionally a thin rubber gaiter 21 may be placed between the hollow body 1 and the pin 4 at the point of emergence of the pin 4. The gaiter prevents the unwanted ingress of moisture.

We claim:
1. A probe assembly including a probe, for indicating both physical contact with an electrically conductive workpiece and misalignment of said probe in a misalignment direction, said probe assembly comprising:
an elongate electrically conducting body having at least one end;
an electrically conducting pin extending beyond said at least one end of said body, one of said pin and body received into a hollow portion of the other of said pin and body;
non-conducting resilient means for mounting said pin with respect to said body and permitting move- ment of said pin with respect to said body in said misalignment direction;

first electrical means for indicating electrical contact between said pin and said workpiece; and second electrical means for indicating electrical contact between said pin and said body during misalignment.

2. A probe assembly according to claim 1, wherein said electrically conducting body comprises a hollow portion, and thus is in the form of a hollow body, and said electrically conducting pin is received into said hollow portion.

3. A probe assembly according to claim 2 in which said hollow body and pin are of cylindrical form.

4. A probe assembly according to claim 3 in which said pin is located within said hollow body by two resilient annular washers which comprise rubber 'O' rings.

5. A probe assembly according to claim 2 in which said pin incorporates an annular electrically conducting ring at a position adjacent to the point at which said pin emerges from said hollow body.

6. A probe assembly according to claim 2 further comprising an electrically conducting cap, slideably mounted on a portion of said pin remote from said hollow body, an electrically conducting collar secured around said pin adjacent to said cap and electrically insulated from said pin and means for resiliently biasing said cap away from said collar.

7. A probe assembly according to claim 6 in which the means for resiliently biasing the cap away from the collar comprises a rubber 'O' ring.

8. A probe assembly according to claim 6 further comprising a thin rubber gaiter located between said hollow body and said pin at the point of emergence of said pin from said hollow body.

9. A probe assembly according to claim 6 and including electrical means for indicating contact between said cap and said collar.

10. A probe assembly according to claim 2 further comprising a thin rubber gaiter located between said hollow body and said pin at the point of emergence of said pin from the hollow body.

* * * * *